(12) United States Patent
Hawryluk et al.

(10) Patent No.: US 6,671,235 B1
(45) Date of Patent: Dec. 30, 2003

(54) METHOD OF AND APPARATUS FOR DEFINING DISK TRACKS IN MAGNETIC RECORDING MEDIA

(75) Inventors: Andrew M. Hawryluk, Los Altos Hills, CA (US); Robert D. Hempstead, Los Gatos, CA (US); David A. Markle, Saratoga, CA (US)

(73) Assignee: Ultratech Stepper, Inc., San Jose, CA (US)

( * ) Notice: Subject to any disclaimer, the term of this patent is extended or adjusted under 35 U.S.C. 154(b) by 0 days.

(21) Appl. No.: 09/536,867

(22) Filed: Mar. 27, 2000

(51) Int. Cl.[7] .......................... G11B 13/00; G11B 11/00
(52) U.S. Cl. .................... 369/14; 369/13.14; 369/13.24
(58) Field of Search ............................... 369/14, 47.44, 369/13.14, 13.54, 13.02, 13.24, 116, 47.51, 47.49, 53.18; 360/59, 126, 77.08, 135

(56) References Cited

U.S. PATENT DOCUMENTS

| | | | |
|---|---|---|---|
| 4,048,660 A | | 9/1977 | Dennison et al. ......... 360/77.08 |
| 4,360,586 A | | 11/1982 | Flanders et al. ............. 430/321 |
| 5,065,377 A | * | 11/1991 | Spruit et al. .............. 369/13.54 |
| 5,270,987 A | * | 12/1993 | Kaku et al. ............... 369/13.02 |
| 5,321,672 A | * | 6/1994 | Miyamoto et al. ........ 369/13.24 |
| 5,371,721 A | * | 12/1994 | Greidanus et al. ........ 369/13.14 |
| 5,572,392 A | | 11/1996 | Aboaf et al. ................. 360/126 |
| 5,706,264 A | * | 1/1998 | Ando ........................ 369/47.44 |

OTHER PUBLICATIONS

Alvin m. Despain, R. Stockton Gains, Acorn Technologies, Inc., *A Servo System for High TPI*, Proceedings of Head/Media Conference, Las Vegas, Nov. 13–14, 1999.

* cited by examiner

Primary Examiner—Ali Neyzari
(74) Attorney, Agent, or Firm—Allston L. Jones

(57) ABSTRACT

A method of, and apparatus for, defining disk tracks in magnetic recording media. The track-writing apparatus (20) is capable of forming tracks (340) with a track width (TW) and track spaces (350) with a space width (SW) on a magnetic media disk (70) having an upper surface (70S), wherein the disk comprises a magnetic medium with a thermal diffusion length (X). The apparatus comprises, in order along an optical axis (A1), a laser light source (30) capable of providing a pulsed laser light beam (B1), a light pipe (32), and illumination shaping optical system (40) that provides substantially uniform illumination over an exposure region (ER), and a phase plate (60) having a phase grating (210) with a grating period (p), arranged proximate and substantially parallel to the upper surface of the disk so as to form an periodic irradiance distribution (380) at the surface of the disk when the phase plate is illuminated with the exposure region. The irradiance distribution is capable of heating one or more regions of the disk to beyond the Curie temperature of the magnetic media. A method of defining the disk tracks using Spatial Period Division (SPD) with the track writing apparatus described above by forming closed annular demagnetized spaces in a periodic magnetized pattern (300) formed in the disk is also disclosed.

31 Claims, 6 Drawing Sheets

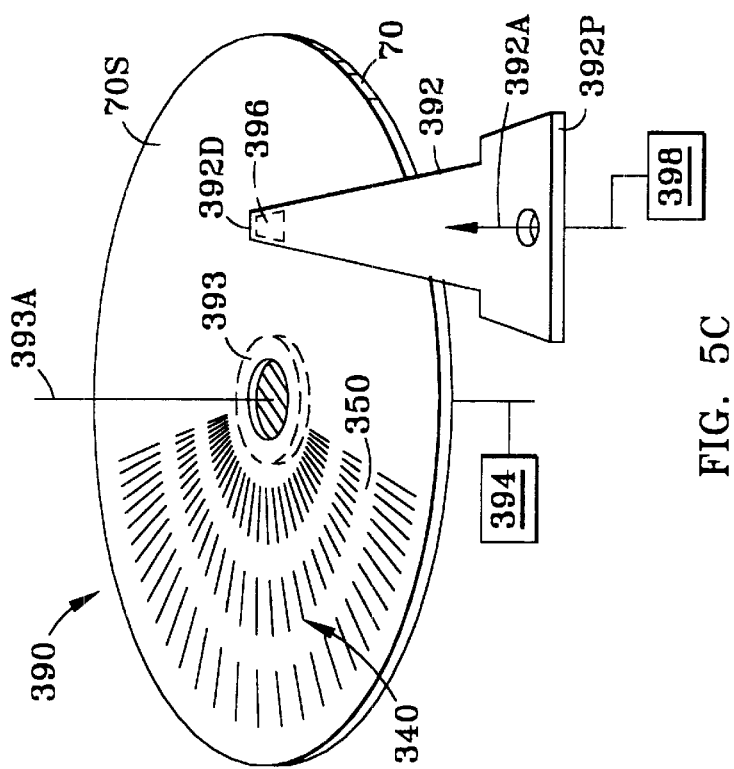
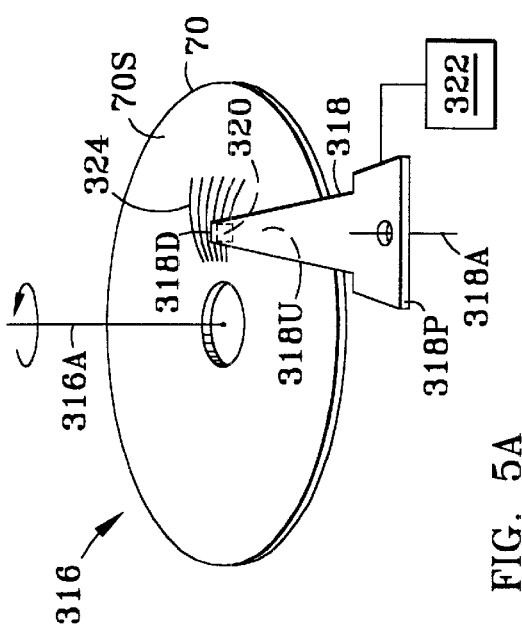
FIG. 5A
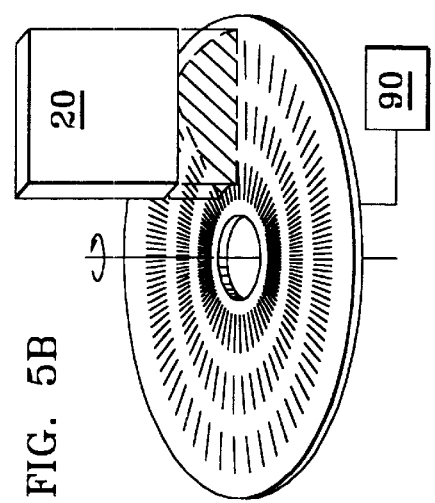
FIG. 5B
FIG. 5C

METHOD OF AND APPARATUS FOR DEFINING DISK TRACKS IN MAGNETIC RECORDING MEDIA

FIELD OF THE INVENTION

The present invention relates to methods and apparatus for recording information on magnetic disk storage media, and in particular, for efficiently defining disk tracks on same.

BACKGROUND OF THE INVENTION

Rapid advances are being made in the density of magnetic recording i.e. the number of bits per square inch that can be recorded. Leading edge products currently store 10 billion bits per square inch and this is generally expected to increase 10 fold in the next 3 or 4 years. A typical disk drive storage system includes a spindle member that supports a circularly shaped magnetic recording medium (i.e., a disk), and a read/write head attached to a recording arm, for reading/writing information from or onto the disk. Information is recorded on the disk by altering the magnetization direction of small radial segments of the disk, wherein the segments are located in narrow annular tracks arranged concentrically. A read/write head positioned over the track can read or write an entire track with each revolution of the disk. Also recorded in each track on the disk are periodic segments that identify the track number, the segment number, and information that allows the deviation of the read head from the track center to be calculated and nulled. This information is put onto the disk immediately following the assembly operation using a "servo-writer" which typically monitors the position of the recording arm using a laser interferometer or a rotary encoder. However, this approach is very slow and will take greater amounts of time to complete as the track density increases on future systems. It is also subject to unrepeatable errors caused by fluttering or vibration of the disk while it is being servo-written. There is some question about the technical feasibility of extending present-day techniques to higher track densities because of the positional errors, which are generated by the departures of the disk from being perfectly flat, and disk vibrations.

Spatial Period Division (SPD) is a technique for producing a periodic or quasieriodic pattern of period "p/m" from a master pattern of period "p" (where "m" is an integer). SPD utilizes the near-field diffraction pattern of a grating. The phenomenon of SPD has been reported on previously and is the subject of an invention by Flanders and Smith, U.S. Pat. No. 4,360,586, which patent is incorporated by reference herein. SPD works best when used to "double" the spatial frequency of an existing grating.

The near field diffraction pattern of a grating can be described by a superposition of all the diffracted orders from the grating. By analyzing the diffracted orders, two observations can be made: First, at discrete distances (gaps) from the grating, the diffracted orders add in such a way as to produce harmonics of the original grating. In particular, a grating of period "p/m" is produced in the near field diffraction pattern of a grating of period "p" at a gap given by:

$$\text{Gap} = p^2/(m\lambda)$$

Second, when considering pure phase gratings with only the positive and negative first order terms (i.e., all non-first order terms are zero), the first-order diffracted orders overlap to produce a grating of period "p/2" for all gaps where the analysis is valid (typically gaps greater than a few wavelengths). Therefore, a reasonable way to produce gratings of period "p/2" is to fabricate phase gratings of period "p" with all non-first order diffraction terms equal to zero, and illuminate the grating at wavelength $\lambda$.

U.S. Pat. No. 4,048,660 discloses an improved servo block pattern that bands a plurality of parallel record tracks into a track seek and follow band. Servo block positions in the record tracks, plus the longitudinal duration of the signal bursts enable simultaneous track seeking and following within a band of tracks. Servo apparatus operable with such patterns adapt to amplitude variations of the servo readback signal to reduce the effect of amplitude variations on servo performance. The servo blocks may have differing frequencies or correlation patterns for enhancing track seek and follow functions.

U.S. Pat. No. 5,572,392 discloses an arbitrary pattern write head assembly for writing timing-based servo patterns on magnetic storage media. The assembly comprises: (a) a first pole piece comprising a substrate comprising a magnetic material, the substrate having a major surface; (b) a plurality of electrically conducting windings formed on the major surface; and (c) a second pole piece formed on the substrate, with a portion thereof formed above the plurality of electrically conducting windings and electrically insulated therefrom, the second pole piece having at least one opening therethrough defining a gap above the electrically conducting windings and the substrate, the second pole piece comprising at least two layers, each layer comprising a magnetic material. A method of batch fabricating servo writer heads is also provided for batch fabrication of servo writer heads at a very low cost. The method enables fabrication of heads capable of azimuthal recording commonly practiced in the video recording art. Hard nitrided Fe/NiFe poletip materials are used to minimize wear in tape head use.

SUMMARY OF THE INVENTION

The present invention relates to methods and apparatus for recording information on magnetic disk storage media, and in particular, efficiently defining disk tracks on same.

A first aspect of the invention is a track-writing apparatus for forming tracks, with a track width, and track spaces, with a space width, on a magnetic media disk having an upper surface and comprising a magnetic medium with a thermal diffusion length. The apparatus comprises, in order along an optical axis: a laser light source capable of providing a pulsed beam of laser light; an illumination shaping optical system that provides substantially uniform illumination over an exposure region; and a phase plate having a phase grating with a grating period p. The phase plate is arranged proximate and substantially parallel to the upper surface of the disk so as to form a periodic irradiance distribution at the surface of the disk when the phase plate is illuminated with the exposure region. The irradiance distribution is capable of heating one or more regions of the disk to beyond the Curie temperature of the magnetic media.

A second aspect of the invention is a process for forming tracks in a magnetic disk having a periodic magnetic pattern formed therein. The process includes the steps of first, irradiating an angular segment of the disk with an irradiance distribution formed by spatial period division in the presence of a fixed magnetic field, and then rotating the disk underneath the pulsed irradiance distribution to form closed, concentric, annular magnetically uniform, i.e. blank spaces in the periodically magnetized medium. The blank spaces define closed annular tracks (i.e., serve to define the boundaries between the closed annular tracks). Each track comprises an annular portion of the periodically magnetized pattern.

A third aspect of the invention is a process for forming tracks in a magnetic disk. The process includes the steps of first, forming a periodic magnetic pattern in the disk, then irradiating an angular segment of the disk with an irradiance distribution formed by spatial period division and in the presence of a fixed magnetic field. Rotating the disk underneath the irradiance distribution forms closed concentric annular spaces with a fixed tangential magnetic orientation (which erases the original periodic magnetic orientation in the irradiated spaces on the disk) in the otherwise periodically magnetized medium, thereby defining closed annular tracks. Each track comprises an annular portion of the periodically varying magnetic pattern.

A fourth aspect of the invention includes a method of formatting a disk by performing the steps as described above in connection with the third aspect of the invention, and then formatting the disk by writing track identification information onto each track.

A fifth aspect of the invention is writing non-tracking information or data onto at least a portion of the formatted disk tracks formed according to the fourth aspect of the invention.

A sixth aspect of the invention is a magnetic media disk product having tracks formed using the process briefly described above and described in greater detail below.

A seventh aspect of the invention is a disk drive apparatus comprising a spindle member having a spindle axis, and a magnetic media disk according to the present invention arranged on the spindle member. The apparatus further includes a spindle member drive unit operatively connected to the spindle member for driving the spindle member about the spindle axis so as to rotate the disk about the spindle axis. Also included is a pivot arm having a distal end that extends over the disk, a proximate end pivotally mounted to a pivot arm axis, and an underside facing the disk. A writing head is arranged on the underside of the pivot arm at or near the distal end. Further included is a pivot arm control unit operatively connected to the pivot arm so at to move the pivot arm about the pivot axis so as to move the writing head over the disk.

BRIEF DESCRIPTION OF THE DRAWINGS

FIG. 5A is a schematic diagram showing a first disk drive for writing a fine, periodic magnetic pattern onto a blank, pre-magnetized, magnetic disk, wherein the pivot arm is rotatable about an axis such that it describes an arc on the disk that approximately follows a radial line originating from the spin stand axis;

FIG. 5B is a schematic diagram showing the apparatus of the present invention forming tracks onto a disk magnetically patterned with first disk drive or spin stand of FIG. 5A;

FIG. 5C is a schematic-diagram showing a second disk drive which has been formatted by writing tracking information with the apparatus of the present invention as depicted in. FIG. 5B.

DETAILED DESCRIPTION OF THE INVENTION

The present invention relates to methods and apparatus for recording information on magnetic disk storage media, and in particular, efficiently defining disk tracks on same.

First described is an apparatus for defining disk tracks in a magnetic disk (hereinafter, simply a "disk"). Then a method of defining the tracks using the apparatus of the present invention is described. The apparatus and method of the present invention reduces the number of timing, tracking and identification segments that need to be recorded on the disk, thereby leaving more room for data to be stored. This is an important advance in the art, as it allows for an increase in useful data by increasing the amount of space available on the disk for data recording. The present invention creates a magnetic pattern on the disk that is of great value in the subsequent self-servo process by reducing the time required to do self-servo and also allowing the positioning transitions to be written in more accurate locations on the disk during self-servo. The apparatus and method of the present invention allows servo information to be written on the disk in less time and to be more accurately placed radially on the disk during the self-servo writing operation. By reducing the time required for self-servo, the cost of self-servo is reduced. By allowing the self-servo to write the position locating transitions more accurately, it is possible to write more tracks with smaller width on the disk, thereby reducing the cost per bit of the drive.

The present invention also allows for rapidly defining tracks on a disk, so that the speed of production of disks having tracks in which data can be recorded is greatly increased. For example, the procedure for performing self-servo as disclosed on U.S. Pat. No. 4,048,660 can be carried out more efficiently and with greater track density. U.S. Pat. No. 4,048,660 is incorporated herein by reference.

Figure 1:
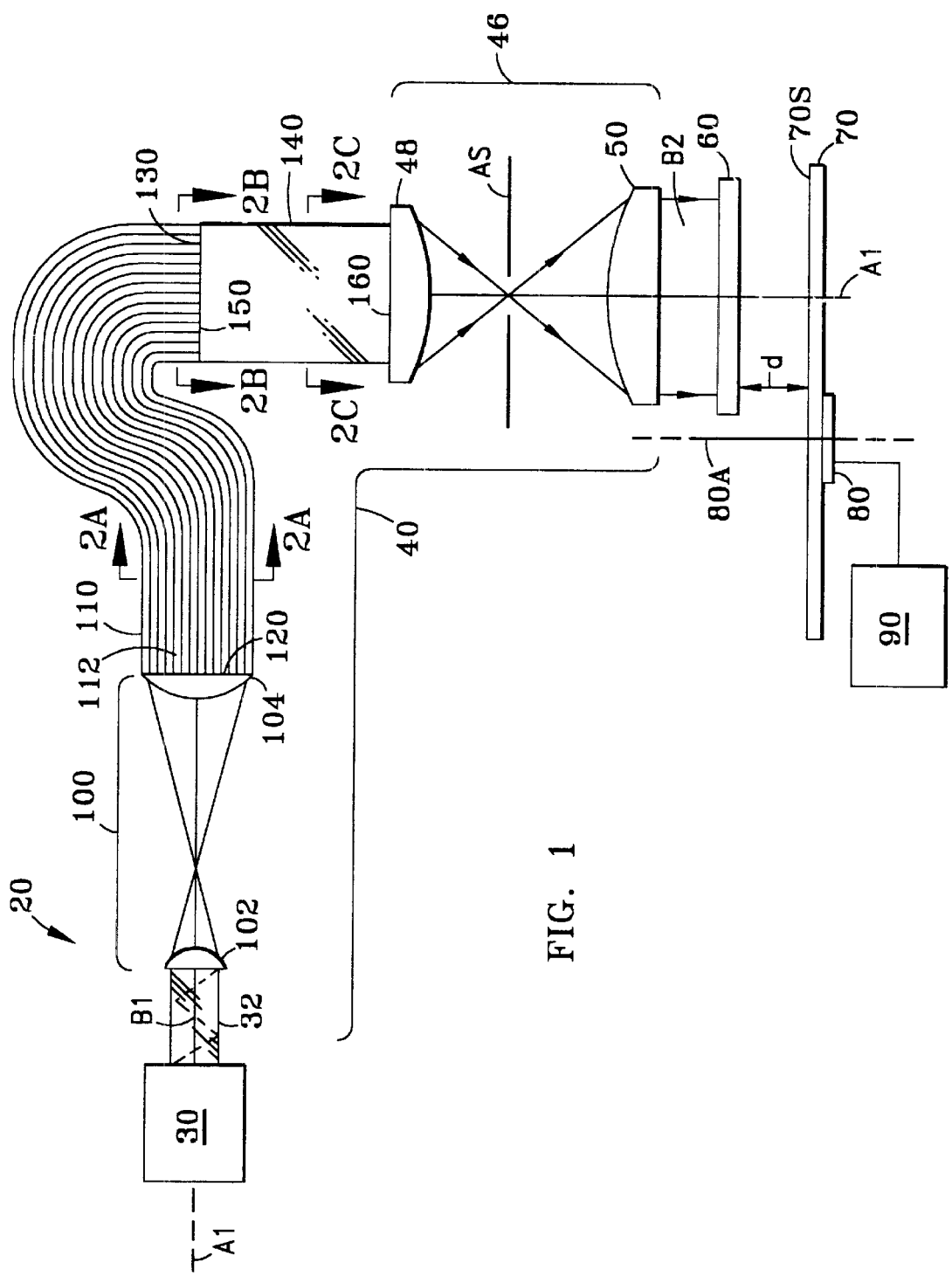
FIG. 1 is a schematic optical diagram of the track-writing apparatus of the present invention.

With reference now to FIG. 1, track-writing apparatus 20 includes a laser light source 30 capable of emitting a laser light beam B1 into a cylindrical light pipe 32 arranged along an optical axis A1. Laser light source 30 can be, for example, a pulsed YAG or Alexandrite laser which has been frequency doubled, capable of emitting pulses of light with temporal pulse durations of 0.05 to 20.0 nanoseconds with an energy per pulse capable of producing an irradiance on the disk in the range of 5 to 500 mJ/cm$^2$. To achieve good uniformity over an extended area and in the time duration of a single pulse, it is necessary to employ a laser designed to have many mode, i.e. m$^2$>30. The preferred wavelength of laser light beam B1 is discussed below.

Arranged adjacent pulsed laser light source 30 along optical axis A1 is an illumination shaping optical system 40 (that includes a relay optical system 46 having an aperture stop AS and shown schematically as having first and second lenses 48 and 50), and a phase plate 60. In a preferred embodiment, phase plate 60 is wedge shaped and covers an angular section of upper surface 70S of disk 70. Phase plate 60 is arranged proximate and substantially parallel to a portion of upper surface 70S of a disk 70, separated therefrom by a gap distance d. Phase plate 60 is discussed in more detail below. Disk 70 is supported by a disk spindle member 80 having a spindle axis 80A. A spindle member drive unit 90 is operatively connected to spindle member 80 and serves to drive the spindle member to spin disk 70 about spindle axis 80A.

Figure 2A:
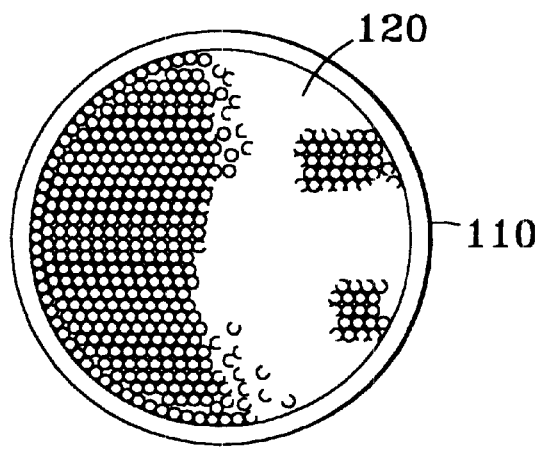
FIG. 2A is a cross-sectional diagram of the input end of the fiber bundle included in the apparatus shown in FIG. 1.
Figure 2B:
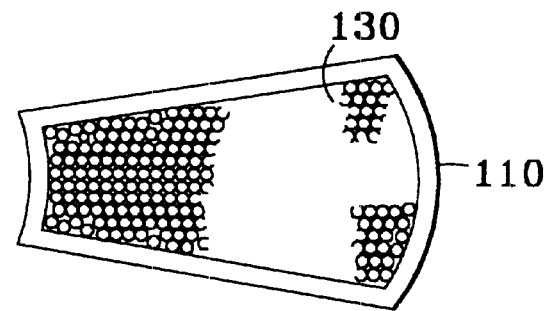
FIG. 2B is a cross-sectional diagram of the output end of the fiber bundle included in the apparatus shown in FIG. 1.
Figure 2C:
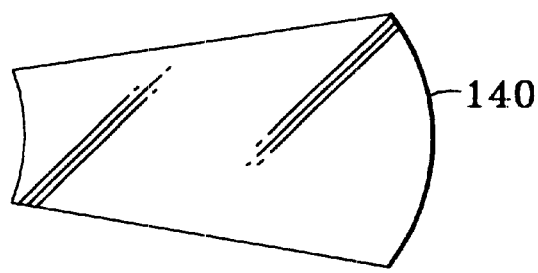
FIG. 2C is a cross-sectional diagram of the light pipe of the apparatus included in the apparatus shown in FIG. 1.

In a preferred embodiment, illumination shaping optical system 40 comprises, in order along optical axis A1 from laser light source 30, a first light pipe 32, a magnifying relay optical system 100 (shown schematically as having two lens elements 102 and 104), a fiber-bundle 110 comprising a plurality of individual optical fibers 112 and having an input end 120 that is preferably (but not necessarily) circular in cross-section (see FIG. 2A) and arranged to receive light from optical system 100, and an output end 130 having a wedge-shaped cross-section (see FIG. 2B). System 40 further includes a light pipe 140 having a wedge-shaped cross-section (see FIG. 2C) matching that of output end 130 of fiber bundle 110.

Light pipe 140 has an input end 150 coupled to output end 130 of fiber-bundle 110, and an output end 160. Light pipe 140 may comprise a solid piece of glass and utilize total internal reflection, or may be a hollow cylinder with reflectively coated inner walls. Ideally, light pipes 32 and 140 have an axial length much greater than their diameter divided by the angular spread of the beams entering them. For example, a 1.0 millimeter diameter beam with an angular spread of 37.5 milliradians (100 times the diffraction limited angular spread for a 375 nanometer wavelength) entering light pipe 32 would require a cylindrical light pipe at least 1 mm in diameter and much longer than 26.7 millimeters, e.g., a 100 to 125 millimeter long light pipe 32 would suffice. The purpose of light pipe 32 is to assure that a uniformly illuminated area is presented to relay 100 and therefore each fiber 112 in fiber bundle 110 sees nearly the same intensity. The purpose of light pipe 140 is to eliminate nonuniformities and high-spatial frequencies in the beam emanating from fiber-bundle 110 caused by the fiber cladding of the individual fibers and gaps between the individual fibers, which do not transmit light.

Optical system 40 further includes an illumination lens 48 adjacent output end 160 of light pipe 140. Illumination lens 48, aperture stop AS and illumination lens 50 form a telecentric relay lens system 46.

Figure 3:
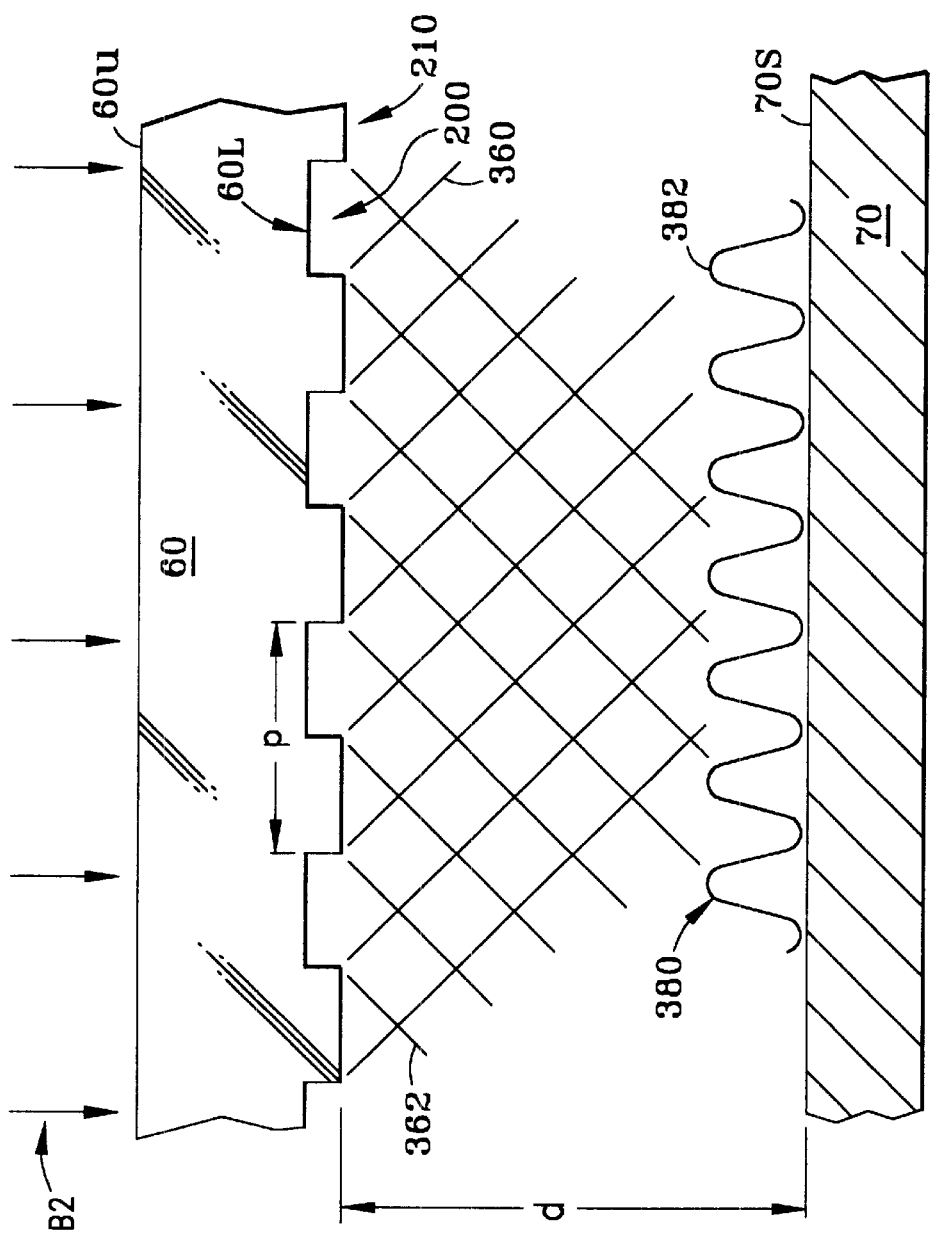
FIG. 3 is a close-up cross-sectional diagram of the phase plate of the present invention showing the resulting light rays and interference pattern when illuminating the phase plate as part of the process of writing tracks onto the disk.
Figure 4:
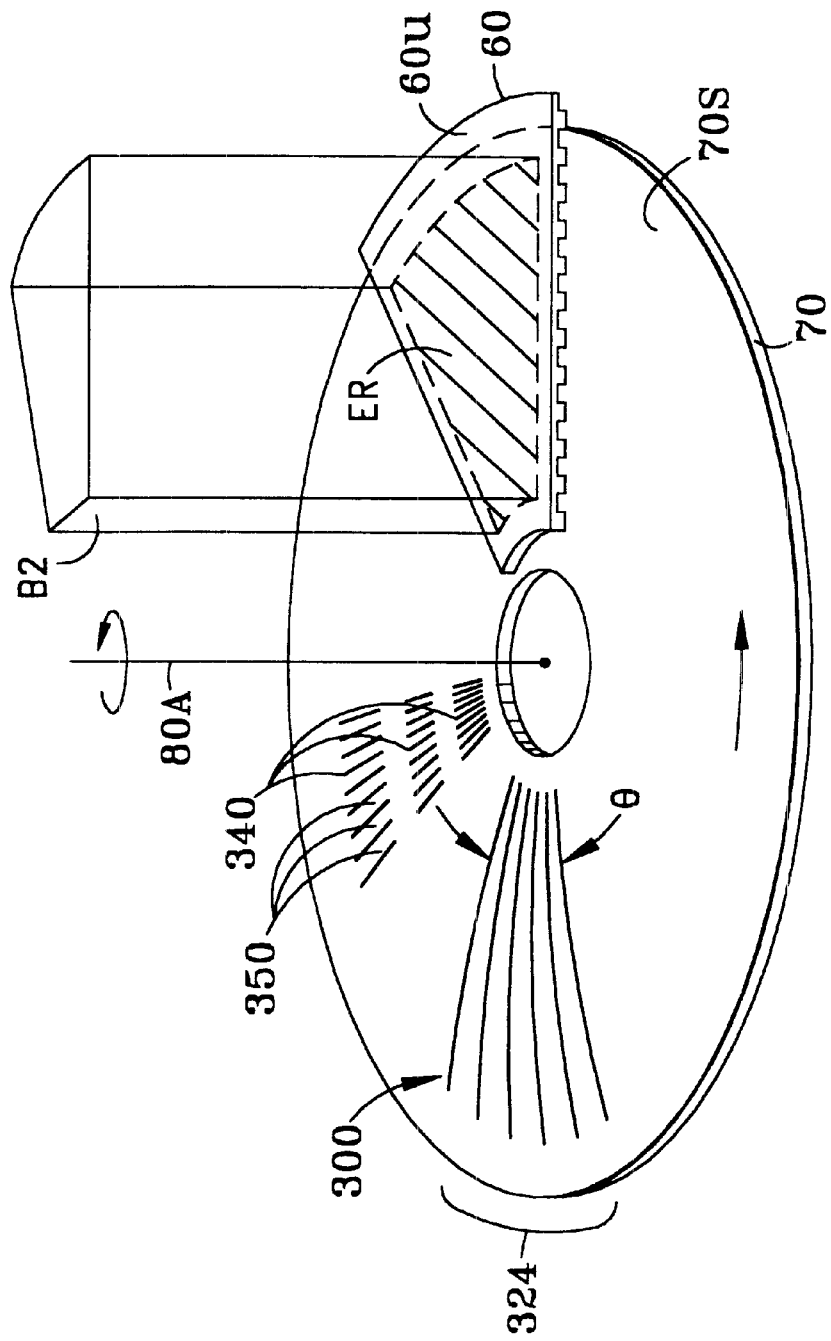
FIG. 4 is a perspective diagram showing the phase plate being illuminated by an illumination beam, a portion of the disk upon which a fine periodic magnetic pattern is formed, and a portion of the disk in which tracks have been defined in the magnetic pattern by illumination of the phase plate.

With reference now also to FIG. 3, phase plate 60 is preferably a glass element such as quartz or fused silica, and includes an upper surface 60U and lower surface 60L. The latter surface includes grooves 200 formed therein, which form a phase grating 210 having a grating period p. Gap distance d should be greater than several grating periods, to avoid near field diffraction effects, but not so large that the finite cone angle of the incident beam causes the interference fringes to be washed out. This depends on the characteristics of phase grating 210 and the light source, but is typically in the range from 1 to 100 times the product $p^2/\lambda$, where $\lambda$ is the wavelength of light from laser light source 30.

With reference now to FIGS. 1–3, the operation of apparatus 20 and the method of defining tracks on disk 70 using apparatus 20 is now described. Light beam B1, comprising light pulses from laser light source 30, is conducted through light pipe 32 and is directed along optical axis A1 to illumination shaping optical system 40. In the preferred embodiment of the latter as described above, the laser light beam emerging from cylindrical light pipe 32 is first incident magnification relay system 100, which expands the cross-sectional diameter of the light beam to match that of input end 120 of fiber-bundle 110. Though input end 120 is preferably circular in cross-section, a cross-sectional shape of input end 120 that matches a non-circular cross-sectional shape of the light beam emerging from a non-circular light pipe 32 may also be employed. Fiber bundle 110 is arranged so that light leaving relay system 100 is coupled efficiently into input end 120 of the fiber bundle. This is accomplished, for example, with the most downstream lens element 104 in relay system 100 having a planar downstream surface, and placing input end 120 of fiber bundle 110 directly up against this planar surface, as shown in FIG. 1.

Light coupled into fiber bundle 110 travels through individual fibers 112 making up the bundle, and reaches output end 130, which in a preferred embodiment, has a wedge shaped cross-section, as shown in FIG. 2B. Light exiting output end 130 does so at an output cone angle nearly equal to that entering the input end of the fiber bundle. The cone angle transmitted by the fiber will probably be less than the limit determined by the refractive indicies of the fiber and its cladding. This light enters light pipe 140, with each individual fiber in fiber bundle 110 serving as a light source for light pipe 140. Thus, the light emanating from output end 130 of fiber bundle 110 then travels down the length of light pipe 140, reflecting off the walls of the light pipe preferably two or more times on average. The number of reflections depends on the length of light pipe 140 and the numerical aperture of fiber bundle 110. Light exiting output end 160 of light pipe 140 is thus uniformized due to the homogenizing action of the reflections within the light pipe.

With continuing reference to FIG. 1, lens 48 focuses the light emanating from output end 160 of light pipe 140 to a point wherein aperture stop AS is located. Light passing through aperture stop AS then diverges and passes to lens 50, whereupon a light beam B2 having, in the preferred embodiment, a wedge-shaped cross-section is directed in a substantially collimated manner to upper surface 60U of phase plate 60. Aperture stop AS serves to limit the angular spread of light beam B2 incident upper surface 60U of phase plate 60.

The manner in which light beam B2 is altered by phase plate 60 to change the magnetic properties of disk 70 to form tracks on the disk according to the present invention is now described in detail with reference to FIGS. 4 and 5A–5C.

In carrying out the method of the present invention, the first step involves creating disk 70 by providing a substrate (also referred to as a "hard disk") and coating the substrate with a magnetic film that has been magnetized in a consistent tangential direction (i.e., clockwise). A fine, repetitive (i.e., alternating clockwise and counterclockwise) magnetic pattern 300 is then written onto disk 70 using a spin stand 316 having a rotational axis 316A and a pivot arm 318 having a proximate end 318P, a distal end 318D, and an underside 318U which faces upper surface 70S of disk 70. An oversize writing head 320 (FIG. 5A) is located at or near distal writing end 318D on underside 318U of pivot arm 318. Pivot arm 318 is arranged offset from disk 70 and capable of pivoting about a pivot arm axis 318A, which passes through pivot arm 318 near proximate end 318P.

Spin stand 316 includes a pivot arm control unit 322 electrically or mechanically connected to pivot arm 318 depending on the specific implementation used. The latter is pivotable about axis 318A so that distal writing end 318D and writing head 320 move radially with respect to disk 70.

Distal writing end 318D spans a large radial segment 324 of disk 70. In a preferred embodiment, pattern 300 comprises finely spaced arcuate lines running in a roughly radial direction with respect to axis 80A (same as 316A), as shown. However, pattern 300 can generally be any periodic pattern from which tracks can be defined, as discussed below.

Simultaneous patterning of a large radial segment of disk 70 leads to a decrease in the linear tangential recording density from the inner to the outer radial region of disk 70 that was recorded simultaneously. Therefore recording a pattern using a head that spans the entire useful radius of the disk may not be optimal. Alternatively, radial segments 324 can be magnetically patterned either by moving an oversize magnetic write head from one radial segment to another, or by using multiple large magnetic write heads, each of which spans a different radial segment. In these ways, the entirety of disk 70 can be covered with a magnetic pattern of nearly the same linear density, in the tangential direction, with only a few revolutions of the disk.

Figure 6:
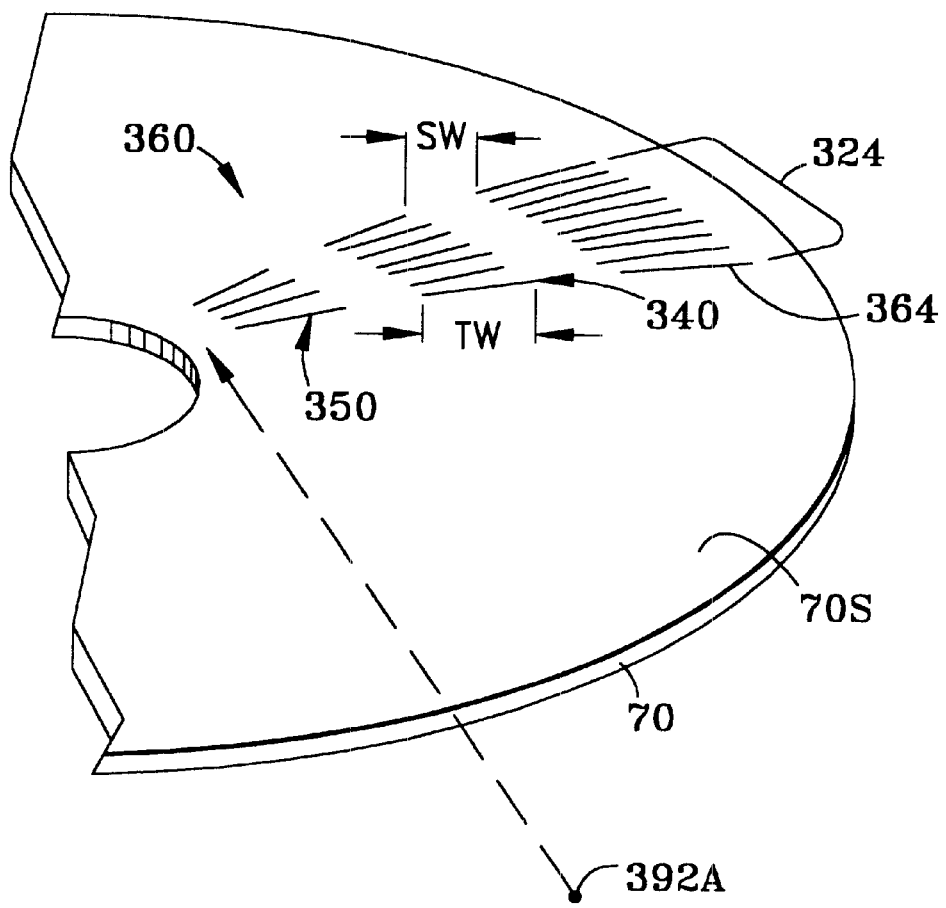
FIG. 6 is a close-up perspective view of a section of the disk having tracks and corresponding annular track spaces formed by erasing annular portions of the periodic magnetic pattern formed on the disk.

With reference to FIG. 5C, once disk 70 is magnetically patterned as described above, the next step is to define the edges of individual tracks 340 by selectivity forming narrow, concentric annular, magnetically erased (i.e. magnetized in a consistent tangential direction) spaces 350 in repetitive magnetic pattern 300. A track 340 is thereby defined by the position of the magnetically patterned annuli separated by magnetically blank (i.e., "erased") annular spaces 350 of pattern 300. A close up of the disk surface showing tracks 340 and annular spaces 350 is shown in FIG. 6. Erasing is done by re-defining the magnetic orientation of the magnetic material within annular spaces 350 using a thermo-magnetic recording process employing SPD, which in the present invention involves passing light from laser light source 30 through phase plate 60. SPD produces a periodic or quasi-periodic interference pattern with, for example, a sinusoidally varying amplitude. The resulting periodic irradiance distribution can be made to heat small regions of disk 70, corresponding to the irradiance maxima of the irradiance distribution, to a temperature above the Curie point in the presence of an external, fixed magnetic field oriented in the tangential direction. After cooling below the Curie point, the heated material is given a magnetic orientation parallel to the fixed external field. With a short enough exposure time, regions on the disk, corresponding to the maxima of the periodic irradiance distribution, are selectively heated. This has the effect of "erasing" in these regions portions of the magnetic information that was originally recorded on the disk as pattern 300. This results in a pattern 360 comprising tracks 340 each comprising regularly spaced magnetic segments 364 formed in an annulus. Each track 340 has a track width TW. Annular spaces 350 have a space width SW. Disk 70 is rotated so that the periodic irradiance distribution travels over surface 70S of the disk, thereby forming closed annular tracks 340 surrounded by closed annular track spaces 350. Thus, the formation of annular spaces 350 define tracks 340 within periodically magnetized pattern 300.

Apparatus 20 is specially designed to perform SPD lithography novelly applied to the present application of enhancing magnetic data storage capacity. Apparatus 20, among other things, has a large depth of focus and can form spaces 350 on disk 70 with extreme precision. The application of SPD lithography to modify the magnetic orientation of a magnetic recording medium so as to form annular spaces 350 in defining tracks 340 on disk 70 is now described.

SPD lithography is a technique that uses the diffraction pattern generated by illuminating a periodic phase grating with collimated light. In the present invention, the grating is phase grating 210 of phase plate 60. By appropriate choice of a master pattern and illumination source, SPD can produce a periodic or quasi-periodic pattern of period "p/m" from a master grating pattern of period "p," where "m" is an integer. In the preferred embodiment m is 2 so that the pattern formed on disk 70 has half of the period of that on the phase grating 210.

As described above, the present invention involves using apparatus 20 to partially erase regions of magnetic pattern 300 to create tracks 340 that are narrow and closely spaced. This is accomplished using SPD lithography to form annular spaces 350 within pattern 300 with each light pulse from light source 30 as disk 70 is rotated under phase plate 60. With reference again to FIG. 3, pulsed laser beam B2 is normally incident upper surface 60U of phase plate 60 and is diffracted into positive first diffraction orders 360 and minus first diffraction order 362, which interfere to generate a standing wave interference pattern at surface 70S of disk 70. The interference pattern results in a periodic irradiance distribution 380 having irradiance maxima 382 and twice the spatial frequency (i.e., half the spatial period) of phase grating 210. In a preferred embodiment, phase grating 210 eliminates a zero order diffracted beam, which would cause the interference pattern to contain other frequency components. For many conditions, this is equivalent to a grating having grooves and protrusions equal in size and which produce a half wavelength phase difference in the incident beam, resulting an equi-spaced periodic irradiance distribution 380 described by a sine-squared function, as shown in FIG. 3

Under appropriate conditions (i.e., $p/2 < \lambda < p$) the period of the interference pattern is nearly independent of the wavelength of laser light source 30 and depends only on the period p of phase grating 210. The wavelength of laser light source 30 needs to be less than the period p of phase grating 210 for diffraction to occur, yet greater than half of the period p to eliminate higher diffraction orders, which would interfere with the irradiance distribution 380. It is also necessary to design phase grating 210 such that the zeroeth-order diffracted term is virtually eliminated, as this diffracted order will also contribute to the interference pattern and alter irradiance distribution 380. There are several possible designs for phase grating 210, the most preferable for the purposes of the present invention being one that produces two equal diffracted amplitudes, with only a very small amount of energy, if any, in the zeroeth diffracted order.

With reference again to FIGS. 4 and 6, it is preferable to irradiate an entire angular segment 324 of disk 70 using a single laser pulse to form annular spaces 350. Angular segment 324 may, in principle, subtend any angle θ. Generally, the smaller angle θ, the less energy per pulse is required and more pulses are required to pattern the whole disk. Thus, the preferred angle θ is determined by these considerations. For a sufficiently large angle θ, there is some curvature of tracks 340. This curvature can be accommodated by forming phase grating 210 to accommodate such curvature e.g., by forming curved grooves 200 to match the desired curvature of tracks 340.

Gap d is limited by the degree of collimation of laser beam B2 incident upper surface 60U of phase plate 60. It is desirable to keep the angular spread of illumination beam B2 small with respect to the space width SW between tracks 340 divided by the gap distance. For example, a gap distance of 10 microns and a space width SW of 0.25 microns would yield a preferred collimation angle of less than 0.025 radians and preferably about 0.0025 radians or about 0.14 degrees.

In practice, it may be desirable that adjacent tracks be separated by a space width SW equal to about 10% of track width TW. This is difficult with sine-squared irradiance distribution 380 because a 1% change in the irradiance of laser light source 30 leads to a 23% change in space width SW. If space width SW of spaces 350 is kept to a more manageable proportion of about 20% of track width TW, then a 1% irradiance change leads to a 5.5% change in the size of space width SW. Once tracks 340 are in place, they are overwritten with track identification information and data, as described below. This operation can reduce space width SW if the space width is deemed to be too wide.

Laser light beam B2 comprises pulsed laser light in order to reduce the diffusion of the heat produced in the magnetic media when forming annular spaces 350 in defining tracks 340. Ideally, the thermal diffusion length X in the medium making up disk 70 over the pulse time t of laser light source 30 should be kept below half of space width SW. The thermal diffusion length X of the material comprising disk 70 is given by:

$$X = (aT)^{1/2} \qquad (1)$$

where a is the thermal diffusivity of the material and T is the time span of the pulse of laser light source 30. The thermal diffusivity a is given by:

$$a = k/c_p p, \qquad (2)$$

where k is the thermal conductivity of the material making up disk 70, $c_p$ is the specific heat capacity of the material, and p is the density of the material.

By way of example, for a track spacing of 0.25 microns, the space width SW would be 20% of this, or 0.05 microns, and the desired thermal diffusion length X is preferably no greater than half of this, or about 0.025 microns. Typically the recording media is a material such as a cobalt/chromium/tantalum/platinum alloy which, assuming it is based primarily on cobalt, has the following properties:

a=0.187 cm$^2$/second (p=8.9 gm/cm$^3$k=0.165 cal/second cm ° C., and p1 $C_p$=0.0989 cal/gm ° C.).

Solving for the thermal diffusion time, T gives:

$T = X^2/a = (0.05 \times 10^{-4} \text{ cm})^2 / (0.187 \text{ cm}^2/\text{second}) = 1.34 \times 10^{-10}$ seconds.

From this calculation, it is apparent that the temporal pulse length of laser light source 30 is preferably on the order of a tenth of a nanosecond. The period p of phase grating 210 would be twice the period of the desired spaces 350, in this example about 0.5 microns. The wavelength of laser light source 30 would need to be between 0.5 microns and 0.25 microns. One possibility for laser light source 30 is a doubled TI-sapphire laser. Assuming it is desired to process an entire radial segment 324 with each laser pulse, it is also necessary to obtain good illumination uniformity in beam B2 over an extended exposure region ER incident upper surface 60U of phase plate 60. This can be accomplished as described above in connection with illumination shaping optical system 40, if laser light source 30 is rendered spatially incoherent by allowing the laser light source to resonate with a large number of modes ($M^2 \approx 100$ or greater).

In a typical hard disk configuration, the read and write heads are located very close together on the end of a pivot arm, such as pivot arm 318 in FIG. 5A. Information to keep the read and write heads centered on the track during the self-servo write operation can be obtained by analysis of the signals read from the track. Such a method is described in the article "A Servo System for High TPI" by Alvin M. Despain, and R. Stockton Gaines, Acorn Technologies, Inc., in the Proceedings of the Head/Media Conference held in Las Vegas in Nov. 13–14, 1999.

Once the location of tracks 340 have been defined by forming spaces 350 by magnetically erasing annular portions of pattern 300, it is possible to assemble disk 70 into a standard disk drive 390 having a pivot arm 392 with a distal end 392D THAT extends over upper surface 70S of disk 70, a proximate end 392P and underside 392U facing upper surface. Disk drive 390 further includes a disk spindle member 393 for supporting disk 70, and a spindle axis 393A. A spindle member drive unit 394 is operatively connected to spindle member 393 and serves to drive the spindle member to rotate disk 70 about spindle axis 393A.

A writing head 396 is arranged on underside 392U at or near distal end 392D. Pivot arm 392 is pivotally mounted to a pivot arm axis 392A and is operatively connected to a pivot arm control unit 398 (FIG. 5C), which drives the pivot arm to pivot about the pivot arm axis so that writing head 396 moves over upper surface 70S of disk 70 as disk 70 rotates underneath. After disk 70 is assembled into disk drive, 390, the next step is the self-servo operation as part of the disk formatting process. This is done prior to data recording on disk 70.

With reference again to FIGS. 4 and 6 and also to FIG. 5C, formatting disk drive 390 writes format information on tracks 340 by over-writing onto at least a portion of the tracks the usual track identification and head positioning information. This information might include the track number, track segment, timing information, positional information, and so on. Finally, data or information unrelated to track formatting information can be recorded and stored on the formatted disk using the formatting disk drive 390, or yet another disk drive (not shown).

While the present invention has been described in connection with preferred embodiments, it will be understood that it is not so limited. Accordingly, the present invention is intended to cover all alternatives, modifications and equivalents as may be included within the spirit and scope of the invention as defined in the appended claims.

What is claimed is:

1. A track-writing apparatus for forming tracks with a track width TW and track spaces with a space width SW on a magnetic media disk having an upper surface and comprising a magnetic medium with a thermal diffusion length, the apparatus comprising, in order along an optical axis:
    a laser light source capable of providing a pulsed beam of laser light;
    an illumination shaping optical system that provides substantially uniform illumination over an exposure region; and
    a phase plate having a phase grating with a grating period p, arranged proximate and substantially parallel to the upper surface of the disk so as to form a periodic irradiance distribution at the surface of the disk when said phase plate is illuminated with said exposure region, said irradiance distribution capable of heating one or more regions of the disk to beyond the Curie temperature of the magnetic media.

2. An apparatus according to claim 1, wherein said phase plate is designed to produce two diffracted orders of roughly equal amplitude.

3. An apparatus according to claim 2, wherein said phase grating includes grooves that are curved.

4. An apparatus according to claim 1, wherein said phase grating is designed such that said irradiance distribution is described by a sine-squared function.

5. An apparatus according to claim 1, wherein said exposure region is edge shaped.

6. An apparatus according to claim 1, wherein said phase plate and said disk upper surface are separated by a gap that is less than half the period of the phase plate grating divided by the collimation angle of the laser beam incident said phase grating plate.

7. An apparatus according to claim 6, wherein said gap is between 10 and 100 microns.

8. An apparatus according to claim 1, wherein said illumination shaping optical system comprises, in order along the optical axis:
- a first light pipe;
- a first relay optical system;
- a fiber bundle having an input end with a first cross-sectional shape coupled to the first relay optical system, and an output end with a second cross-sectional shape;
- a second light pipe having an input end and an output end and a crosssectional shape matching said second cross-sectional shape of said fiber bundle with said second light pipe input end coupled to said fiber bundle output end; and
- a second relay optical system for forming a substantially collimated beam from light exiting said second light pipe so as to form said exposure region.

9. An apparatus according to claim 8, wherein second cross-sectional shape of said output end is wedge shaped.

10. An apparatus according to claim 1, further including a disk spindle member with a spindle axis, for supporting the disk, and a spindle member drive unit operatively connected to said spindle member for driving said spindle member to spin the disk about said spindle axis.

11. An apparatus according to claim 1, wherein said laser light source has a wavelength in the range between p and p/2, where p is the grating period.

12. An apparatus according to claim 11, wherein said pulsed beam of laser light comprises a plurality of light pulses each having a temporal pulse length sufficiently short that thermal diffusion in the magnetic medium over the temporal pulse length is less than the track space width SW.

13. A process for forming tracks in a magnetic disk having a periodic magnetic pattern formed therein, comprising the steps of:
a) irradiating an angular segment of the disk with an irradiance distribution formed by spatial period division, in the presence of a fixed magnetic field; and
b) rotating the disk underneath said irradiance distribution to form closed concentric annular magnetically uniform spaces in the periodic magnetic pattern, thereby defining closed annular tracks comprising portions of the periodic magnetic pattern.

14. A process according to claim 13, wherein said irradiance distribution is described by a sine-squared function.

15. A process for forming tracks in a magnetic disk, comprising the steps of:
a) forming a periodic magnetic pattern in the disk;
b) irradiating an angular segment of the disk with an irradiance distribution formed by spatial period division in the presence of a fixed magnetic field; and
c) rotating the disk underneath said irradiance distribution to form closed concentric annular magnetically uniform spaces in the periodic magnetic medium, thereby defining closed annular tracks comprising portions of the periodic magnetic pattern.

16. A process according to claim 15, wherein said irradiance distribution is described by a sine-squared function.

17. A process according to claim 15, further including the step, after said step c), the step of:

d) formatting the disk by writing track identification information onto the tracks.

18. A process according to claim 17, wherein:
i) said step a) is performed on one of a first disk drive or a spin stand;
ii) said steps b) and c) are performed on the apparatus of claim 1; and
iii) said step d) is performed on one of a second disk drive or an assembled disk drive which contains the magnetically patterned disk.

19. A process for defining tracks in a magnetic disk comprising the steps of:
a) forming a regular magnetic pattern on the disk;
b) defining tracks on the disk by forming track spaces comprising narrow closed annular magnetically uniform regions within the regular magnetic pattern using an irradiance distribution produced by an interference pattern formed by passing pulsed laser illumination through a phase grating, and a fixed magnetic field.

20. A process according to claim 19, further including, after said step b), a step:
c) overwriting at least a portion of the tracks with track identification information.

21. A process according to claim 19, wherein said step b) includes the steps of:
i) irradiating an annular portion of the disk, and
ii) rotating the disk.

22. A process according to claim 20, further including, after step c), a step:
d) writing non-tracking information onto at least a portion of the tracks.

23. A magnetic media disk product formed by the process steps of:
a) forming a periodic magnetic pattern in the disk;
b) irradiating an angular segment of the disk with an irradiance distribution formed by spatial period division in the presence of a fixed magnetic field; and
c) rotating the disk underneath said irradiance distribution to form closed concentric annular magnetically uniform spaces in the periodic magnetic medium, thereby defining closed annular tracks comprising portions of the periodic magnetic pattern.

24. A magnetic media disk product formed by the process steps of:
a) forming a regular magnetic pattern on the disk;
b) defining tracks on the disk by forming track spaces comprising narrow closed annular magnetically uniform regions within the regular magnetic pattern using an irradiance distribution produced by an interference pattern formed by passing pulsed laser illumination through a phase grating, and a fixed magnetic field.

25. A disk product according to claim 24, wherein the process of forming the product further including, after said step b), a step:
c) overwriting at least a portion of the tracks with track identification information.

26. A disk product according to claim 24, wherein the process of forming the product includes in said step b) the steps of:
i) irradiating an annular portion of the disk, and
ii) rotating the disk.

27. A disk product according to claim 26, wherein the process of forming the product includes, after step c), a step:
d) writing non-tracking information onto at least a portion of the tracks.

28. A disk drive apparatus comprising:

a spindle member having a spindle axis;

a magnetic media disk according to claim 23 arranged on said spindle member;

a spindle member drive unit operatively connected to said spindle member for driving said spindle member about said spindle axis so as to rotate said disk about said spindle axis;

a pivot arm having a distal end which extends over said disk, a proximate end pivotally mounted to a pivot arm axis, and an underside facing said disk;

a writing head arranged on said underside of said pivot arm at or near said distal end; and a pivot arm control unit operatively connected to said pivot arm so at to move said pivot arm about said pivot axis so as to move said writing head over said disk.

29. A disk drive apparatus comprising:

a spindle member having a spindle axis;

a magnetic media disk according to claim 24 arranged on said spindle member;

a spindle member drive unit operatively connected to said spindle member for driving said spindle member about said spindle axis so as to rotate said disk about said spindle axis;

a pivot arm having a distal end which extends over said disk, a proximate end pivotally mounted to a pivot arm axis, and an underside facing said disk;

a writing head arranged on said underside of said pivot arm at or near said distal end; and a pivot arm control unit operatively connected to said pivot arm so at to move said pivot arm about said pivot axis so as to move said writing head over said disk.

30. A process of formatting a disk in a disk drive, comprising the steps of:

a) providing a disk drive having a magnetic media disk according to claim 23; and b) overwriting at least a portion of the tracks with track identification information and head positioning information.

31. A process of formatting a disk in a disk drive, comprising the steps of:

a) providing a disk drive having a magnetic media disk according to claim 24; and b) overwriting at least a portion of the tracks with track identification information and head positioning information.

* * * * *